Figure 1:
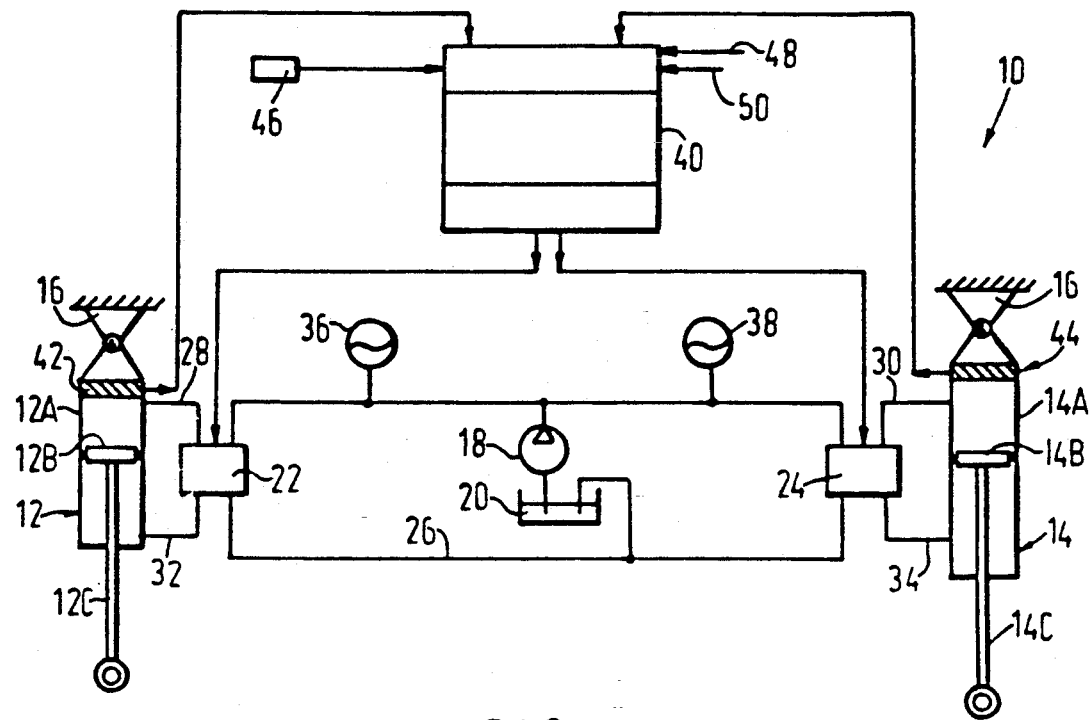

United States Patent [19]
Harvey-Bailey

[11] Patent Number: 5,230,529
[45] Date of Patent: Jul. 27, 1993

[54] CONTROL ARRANGEMENT

[75] Inventor: Rhoderick M. Harvey-Bailey, Derby, England

[73] Assignee: Harvey-Bailey Engineering Ltd., Derby, England

[21] Appl. No.: 669,413

[22] PCT Filed: Sep. 19, 1989

[86] PCT No.: PCT/GB89/01092

§ 371 Date: Apr. 22, 1991

§ 102(e) Date: Apr. 22, 1991

[87] PCT Pub. No.: WO90/03282

PCT Pub. Date: Apr. 5, 1990

[30] Foreign Application Priority Data

Sep. 22, 1988 [GB] United Kingdom ............... 8822353

[51] Int. Cl.$^5$ .............................................. B60G 11/26
[52] U.S. Cl. ................................. 280/707; 280/6.11;
280/112.2; 280/772; 280/DIG. 1
[58] Field of Search ............... 280/6.11, 112.2, 707,
280/772, DIG. 1

[56] References Cited

U.S. PATENT DOCUMENTS 5,015,009  5/1991  Ohyama et al. ................ 280/772

FOREIGN PATENT DOCUMENTS

| 0114757 | 8/1984 | European Pat. Off. . |
| 0190978 | 8/1986 | European Pat. Off. . |
| 3705520 | 9/1988 | Fed. Rep. of Germany . |
| 1374399 | 7/1963 | France . |
| 63-41222 | 2/1988 | Japan . |
| 1004727 | 9/1965 | United Kingdom . |
| 1315164 | 4/1973 | United Kingdom . |
| 2097730 | 11/1982 | United Kingdom . |
| 2189751 | 4/1987 | United Kingdom . |
| 2206551 | 1/1989 | United Kingdom . |

Primary Examiner—Joseph E. Valenza
Attorney, Agent, or Firm—Oliff & Berridge

[57] ABSTRACT

An active roll control system for attachment to a vehicle having a wheel suspension system includes an actuator attached by a linkage to the wheel suspension system. The actuator is controlled by a programmable computer having input signals from a lateral accelerometer and a load cell from an output signal to a servo-valve controlling the hydraulic fluid to the actuator. The active roll control system operates to maintain the vehicle in a substantially level state about the vehicle longitudinal axis.

16 Claims, 1 Drawing Sheet

CONTROL ARRANGEMENT

This invention relates to motor vehicles.

In particular the invention relates to an active roll control arrangement for a motor vehicle already equipped with wheel suspension systems. For example, such wheel suspension systems can comprise springs and dampers.

The handling and ride characteristics of road vehicles are essentially a compromise because the wheel suspension systems cannot manage to the fullest extent all the different types of motion of the motor vehicle.

Usually wheel suspension systems incorporating springs and dampers provide adequate handling and ride qualities while the vehicle is travelling in a straight line. When the motor vehicle turns a corner there is a tendency for the motor vehicle to roll about its longitudinal axis under the application of lateral forces incurred by the cornering motion.

The conventional spring and damper wheel suspension system will be designed to try and minimise the degree of roll, and sometimes further arrangements such as anti roll bars are fitted to further minimise the degree of roll. However, a degree of roll is usually encountered causing uncomfortable movement to drivers and passengers and unwelcome motion of loose objects in the motor vehicle. It is therefore desirable that the motor vehicle remains level in a lateral sense while the vehicle is cornering.

Accordingly, the present invention is concerned with providing a roll control arrangement for a vehicle which is already equipped with a known form of wheel suspension device or devices and which is active only during vehicle cornering to correct the vehicle roll and to maintain the vehicle substantially level in the lateral sense during vehicle cornering.

An active roll control system for attachment to a vehicle, the vehicle having existing wheel suspension means to support the vehicle dead weight and damping means to attenuate dynamic loads applied to the vehicle, the active roll control system comprising between at least one pair of front or rear pairs of vehicle wheels, at least one actuating means being secured to effect displacement between the sprung and unsprung mass of the vehicle, and means responsive to loads applied to the actuating means to generate a signal. The actuating means operates as a function of the signal so that loads are applied to the vehicle suspension means independently of the wheel existing damping means to oppose any dynamic loads tending to roll the vehicle. The actuating means comprises a double acting hydraulic actuator, the actuator being connected to the suspension means of at least one pair of vehicle wheels by an actuating linkage. The actuating linkage is arranged to move the suspension means of one vehicle wheel of the pair of vehicle wheels in one direction and the suspension means of the other vehicle wheel of the pair in the opposite direction to maintain the vehicle in a substantially level position about its longitudinal axis.

An actuating means can be provided for one or both pairs of vehicle wheels, and the actuating means can comprise a double acting hydraulic actuator.

The attachment of the hydraulic actuator can include a linkage arranged so that upon operation of the hydraulic actuator, the vehicle is maintained substantially level about its longitudinal axis.

The attachment of the hydraulic actuator can be between the vehicle and the wheel suspension means of the motor vehicle or between the wheel suspension means of the motor vehicle, for example the two independently suspended front wheels of a motor vehicle.

The means responsive to the loading of the actuating means can generate an electric signal and can include signal processing means for the signal.

The signal processing means can comprise a computer arranged to receive electric input signals from a source independent of the loading of the actuating means.

The signals from the independent source can comprise signals from a lateral accelerometer and the signals from the means responsive to the loading of the actuating means can originate from a load cell.

The supply of hydraulic fluid to the hydraulic actuator can be controlled by a servo valve which is included in an hydraulic power supply comprising an hydraulic pump and accumulator.

Other control devices can be used as well as, or instead of a servo-valve, for example, a solenoid valve with pulse width modulation.

The servo valve can be controlled by a signal from the signal processing means.

In a further arrangement according to the present invention, a hydraulic actuator can be provided for each wheel of a motor vehicle, each wheel being equipped with a wheel suspension means, each hydraulic actuator having signal generating means which are used to operate the hydraulic actuators to maintain the motor vehicle substantially level while the motor vehicle is cornering.

Figure 2:
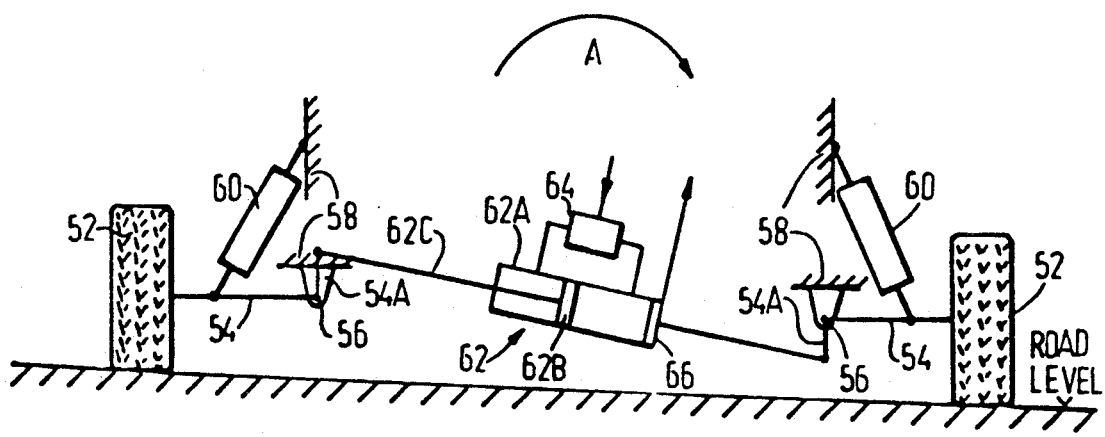

The present invention will now be more particularly described with reference to the accompanying drawings in which:

FIG. 1 is a diagramatic representation of one form of roll control arrangement according to the present invention; and FIG. 2 illustrates one form of linkage for use with the roll control arrangement illustrated in FIG. 1.

Referring to the figures, a roll control arrangement 10 comprises two double acting hydraulic actuators 12 and 14 located at the front and rear of a motor vehicle (not shown) respectively.

Each hydraulic actuator comprises a cylinder 12A, 14A attached to the sprung mass 16 of the motor vehicle and a piston 12B, 14B attached by a piston rod 12C, 14C to the unsprung mass of the vehicle.

For example, in the case of the hydraulic actuator 12, the rod 12C can be attached by a suitable linkage (see FIG. 2) to the wishbones on which the front wheels of the motor vehicle are mounted and the rear hydraulic actuator 14 can also be attached by a suitable linkage to the rear axle of a vehicle. In this way, by means of appropriate linkages, a single hydraulic actuator can be used for each pair of vehicle wheels in order to correct the roll of the vehicle which occurs when the vehicle corners. Although the roll control arrangement in FIG. 1 illustrates the use of a hydraulic actuator for both the front and rear pairs of wheels, it may only be necessary to use a hydraulic actuator and suitable linkage for the front pair of wheels in order to maintain the vehicle substantially level in the lateral sense while the vehicle is cornering.

The roll control arrangement 10 also includes an hydraulic power supply comprising an hydraulic pump 18, which draws hydraulic fluid from a reservoir 20 and supplies hydraulic fluid to servo valves 22 and 24 associated with the hydraulic actuators 12 and 14 respectively. The hydraulic power supply includes a return line 26 to the reservoir 20.

The servo-valve 22 and 24 can be replaced by a solenoid valve provided with pulse width modulation or any other type of electrically controlled hydraulic valve.

The servo valves 22 and 24 can be controlled so as to return hydraulic fluid to the reservoir via the return line 26 or to supply hydraulic fluid to the upper part of the hydraulic actuators 12 and 14 by lines 28 and 30 respectively or to the lower part of the hydraulic actuators by lines 32 and 34 respectively.

The hydraulic power supply circuit also includes accumulators 36 and 38.

The operation of the servo valves 22 and 24 is controlled by a control unit comprising a pre-programmed or programmable computer 40 having an electrical input from load cells 42 and 44 on the actuators 12 and 14 respectively, input from one or more lateral accelerometers 46, and inputs from other sources 48 and 50 which can be, for example, position and attitude transducers.

All of these electrical input signals are processed by the computer 40 to generate an output to each servo valve 22 and 24 to supply and withdraw hydraulic fluid as appropriate from one or both hydraulic actuators 12 and 14 so as to maintain the motor vehicle substantially level in the lateral sense while the motor vehicle is cornering.

FIG. 2 shows diagramatically a roll control arrangement according to the present invention applied to the suspended front wheels 52 of a motor vehicle (not shown). Each of the wheels 52 is mounted on a wishbone 54 pivoted at 56 to the chassis 58 of the vehicle. A conventional spring and damper strut 60 is mounted between each wishbone 54 and the vehicle structure 58.

The roll control arrangement comprises a single actuator 62 comprising a cylinder 62A, piston 62B, piston rod 62C, together with a servo valve 64 and a load cell 66.

Each wishbone 54 has a crank arm 54A and the cylinder 62A is connected to one end of crank arm 54A, while the piston rod 62C is connected to the other end of crank arm 54A.

Electrical signals from the load cell 66 pass to a computer (not shown) similar to the computer 40, described with reference to FIG. 1, and the servo valve 64 receives a control signal from the computer. The computer also receives inputs analogous to the inputs 46, 48 and 50. This servo valve 64 forms part of a hydraulic circuit (not shown), similar to the hydraulic circuit shown in FIG. 1, that is a circuit including a pump, reservoir, and accumulator.

It will be appreciated that extending or reducing the length of the actuator 62 will cause each wishbone 54 to rotate about its pivot 56.

If the vehicle is cornering and is tending to roll in the direction of arrow A, thereby causing the right hand strut 60 to compress and the left hand strut 60 to extend, the signal from the computer to the servo valve 64 will be such that hydraulic fluid will be pumped from the right hand side of the cylinder 62A and hydraulic fluid will be admitted to the left hand side of the cylinder 62A, thereby shortening the actuator 62 and causing the left hand strut 60 to compress and the right hand strut 60 to extend in order to maintain the vehicle substantially level while cornering.

While the motor vehicle is travelling in a straight line, the roll control arrangement 10 is inoperative and the deadweight of the vehicle and the dynamic forces acting on the vehicle are reacted by the existing wheel suspension arrangements for the wheels of the motor vehicle.

It will be appreciated that while the motor vehicle is travelling in a straight line there could be electric signals generated by the load cells 42 and 44 and also from the other sources 48 and 50. However, the logic of the signal processing is such that unless there is an input from the lateral accelerometer 46 which senses the forces generated when the motor vehicle corners, signal processing will not occur, and thus, there will be no output from the computer 40 to one or both of the servo valves 22 and 24.

It will also be appreciated that a roll control arrangement according to the present invention does not comprise part of the vehicle suspension system. The roll control arrangement according to the present invention is not operational while the vehicle is travelling in a straight line or stationary, and its function is to react the loads generated due to vehicle cornering so that the vehicle is maintained substantially level in a lateral sense.

Therefore, the roll control arrangement of the present invention functions to level the vehicle in the lateral sense, i.e. about the longitudinal axis of the vehicle, and does not form part of the normal vehicle suspension arrangements.

The roll control arrangement according to the present invention is load sensitive, that is as the loads on one or both of the hydraulic actuators vary according to the rate of cornering, the electric signals generated by the load cells will vary and therefore the correcting displacement of the hydraulic actuators brought about by the control of the respective servo valves will vary according to the applied load.

I claim:

1. An active roll control system for attachment to a vehicle having a longitudinal axis, at least two transverse wheel pairs, a sprung and an unsprung mass and an existing wheel suspension means including a spring to support the sprung mass and damping means located between the sprung and unsprung mass to attenuate dynamic loads applied to the vehicle, the active roll control system comprising:

at least one actuating means being secured to effect displacement between the sprung and unsprung mass of the vehicle and located between at least one of the transverse wheel pairs, the actuating means including a double acting hydraulic actuator having a cylinder and a piston slidable therein, the actuator being connected to the suspension means of said transverse wheel pair by an actuating linkage free of attachment to the sprung mass, the actuating linkage having a first element driven by movement of the piston to move the suspension means of one vehicle wheel of the transverse wheel pair in one direction and a second element driven by movement of the cylinder to move the suspension means of the other vehicle wheel of said transverse wheel pair in an opposite direction; and means responsive to dynamic loads applied to the actuating means for generating a signal, the actuating means being responsive to the signal so that loads are applied to the vehicle suspension means by the actuating means independently of the wheel damping means to oppose any dynamic loads tending to roll the vehicle, thereby maintaining the vehicle in a substantially level position about the longitudinal axis.

2. A system as claimed in claim 1, wherein the vehicle wheel pair comprise the front wheels of a vehicle.

3. A system as in claim 1, wherein the vehicle wheel pair comprise the rear wheels of a vehicle.

4. A system as claimed in claim 1, wherein an active roll control system is provided for both pairs of vehicle wheels.

5. A system as claimed in claim 1, wherein the linkage includes an arm rigidly secured to a pivotable arm of each wheel of the or each pair of vehicle wheels, a rod attached to the piston of the actuator attached to one of said arms and a further rod extending from the actuator and attached to the other one of said arms.

6. A system as claimed in claim 1, wherein the actuating means is secured between the vehicle and the wheel suspension means of the vehicle.

7. A system as claimed in claim 1, wherein the actuating means is secured between the wheel suspension means of at least one pair of wheels of the vehicle.

8. A system as claimed in claim 1, wherein the means responsive to the loading of the actuating means generates an electrical signal, and includes means for processing said signal.

9. A system as claimed in claim 8, wherein the processing means receive electrical signals from a source independent of the loading of the actuating means.

10. A system as claimed in claim 9, wherein the independent source comprises a lateral accelerometer.

11. A system as claimed in claim 1, wherein the means responsive to the loading of the actuating means comprises a load cell.

12. A system as claimed in claim 8, wherein the actuator has a hydraulic fluid supply including a pump, a reservoir and an accumulator, the hydraulic supply to the actuator being controlled by a servo-valve, the servo-valve being controlled by an output from the signal processing means.

13. A system as claimed in claim 8, wherein the signa processing means comprises a computer programmed to control the servo-valve so that the actuator operates on the wheel suspension means to maintain the vehicle on a substantially level state about the longitudinal axis of the vehicle.

14. A vehicle having wheel suspension means to support the vehicle sprung mass and damping means to attenuate dynamic loads applied to the vehicle characterised by the provision of an active roll control system as claimed in claim 1 to control the position of the vehicle in the roll mode only.

15. A system as in claim 5, wherein said actuating means comprises two ends, one end being attached to the unsprung mass of the vehicle near one wheel of said transverse vehicle wheel pair and attached to the unsprung mass of the vehicle near the other wheel of said transverse vehicle wheel pair.

16. An active roll control system for attachment to a vehicle having two or more transverse vehicle wheel pairs and an existing suspension means located between a sprung and unsprung mass of the vehicle, the active roll control system comprising:

at least one actuating means attachable to at least one of said transverse vehicle wheel pairs to effect displacement between the sprung and unsprung mass of the vehicle, the actuating means including a double acting hydraulic actuator having a cylinder and piston slidable therein, the actuator having an actuating linkage free of attachment to the sprung mass, the actuating linkage having a first element driven by movement of the piston to move the suspension means of one vehicle wheel of the transverse vehicle wheel pair in one direction and a second element driven by movement of the cylinder to move the suspension means of the other vehicle wheel of said transverse wheel pair in an opposite direction when installed on the vehicle;

means responsive to dynamic loads applied to the actuating means for generating a signal;

acceleration sensing means for generating a signal representing acceleration of the vehicle; and control means for analyzing the actuating means signal and the acceleration signal to derive a control value for activating said actuating means, the actuating means operating independently of existing wheel suspension means to oppose any dynamic loads tending to roll the vehicle to maintain the vehicle in a substantially level position about the longitudinal axis to control vehicle roll only during cornering of the vehicle.

* * * * *